United States Patent
Rakshit et al.

(10) Patent No.: US 11,227,583 B2
(45) Date of Patent: Jan. 18, 2022

(54) ARTIFICIAL INTELLIGENCE VOICE RESPONSE SYSTEM HAVING VARIABLE MODES FOR INTERACTION WITH USER

(71) Applicant: International Business Machines Corporation, Armonk, NY (US)

(72) Inventors: Sarbajit K. Rakshit, Kolkata (IN); Christian Compton, Austin, TX (US); Jeremy R. Fox, Georgetown, TX (US); Trudy L. Hewitt, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 16/674,429

(22) Filed: Nov. 5, 2019

(65) Prior Publication Data

US 2021/0134270 A1 May 6, 2021

(51) Int. Cl.
*G10L 15/22* (2006.01)
*G10L 15/07* (2013.01)

(52) U.S. Cl.
CPC ............. *G10L 15/07* (2013.01); *G10L 15/22* (2013.01); *G10L 2015/223* (2013.01); *G10L 2015/227* (2013.01)

(58) Field of Classification Search
CPC ... G10L 15/22; G10L 2015/223; G10L 15/32; G10L 15/063; G10L 15/1815; G10L 15/197; G10L 15/26; G10L 2015/225; G10L 15/07; G10L 15/1822; G10L 15/183; G10L 15/19; G10L 17/00; G10L 17/06; G10L 17/22; G10L 13/04; G10L 15/00; G10L 15/08; G10L 15/16; G10L 15/18;

(Continued)

(56) References Cited

U.S. PATENT DOCUMENTS 9,847,084 B2   12/2017   Gustafson et al.
9,936,062 B2   4/2018    Dayama et al.
(Continued)

FOREIGN PATENT DOCUMENTS

EP   2575128 A2   8/2013

OTHER PUBLICATIONS

"Global Intelligent Virtual Assistant Market 2018-2023: Market Value is Projected to Exceed US$ 9 Billion by 2023, Expanding at a CAGR of 32%—ResearchAndMarkets.com", Business Wire, Dublin, Jul. 23, 2018, 3 pages, <https://www.businesswire.com/news/home/20180723005506/en/Global-Intelligent-Virtual-Assistant-Market-2018-2023-Market>.

(Continued)

*Primary Examiner* — Vijay B Chawan
(74) *Attorney, Agent, or Firm* — Michael A. Petrocelli

(57) ABSTRACT

The present disclosure includes customizing responses by an Artificial Intelligence (AI) system using a response mode for interaction with a user. A question or command is received at an AI system from an associated AI device which receives the question or command from an initiating user of a plurality of users in a vicinity of the AI device. A preference of an interaction mode for the initiating user is determined, and the preferred interaction mode is determined using a knowledge corpus. An answer to the question or command using the AI system is generated. Using the AI device, a communication to the initiating user which includes the answer is initiated, via a communication mode based on the interaction mode preference of the initiating user.

20 Claims, 9 Drawing Sheets

(58) Field of Classification Search
CPC ......... G10L 15/24; G10L 15/28; G10L 15/30;
G06N 20/00; G06N 3/006; G06N 3/0445;
G06N 3/0454; G06N 5/02; G06N 5/027;
G06N 20/10; G06N 3/0436; G06N 3/049;
G06N 3/084; G06N 3/088; G06N 3/126;
G06N 5/041; G06N 7/005; G06F 40/30;
G06F 40/35; G06F 40/279; G06F 40/40;
G06F 40/58; G06F 40/211; G06F 40/253;
G06F 40/274; G06F 40/284; G06F 40/56
USPC ............ 704/270, 270.1, 275, 259, 202, 232
See application file for complete search history.

(56) References Cited

U.S. PATENT DOCUMENTS

| | | | |
|---|---|---|---|
| 9,948,778 B2 | 4/2018 | de Silva et al. | |
| 10,228,261 B2 | 3/2019 | Cavanaugh et al. | |
| 10,685,187 B2* | 6/2020 | Badr | G10L 15/1815 |
| 10,934,026 B2* | 3/2021 | Corey | B64G 1/26 |
| 10,958,599 B1* | 3/2021 | Penov | G06F 16/176 |
| 10,978,056 B1* | 4/2021 | Chai | G06F 40/56 |
| 10,984,782 B2* | 4/2021 | Finkelstein | H04N 5/23219 |
| 2014/0164400 A1 | 6/2014 | Kruglick | |
| 2014/0272821 A1 | 9/2014 | Pitschel | |
| 2014/0317502 A1 | 10/2014 | Brown | |
| 2016/0151917 A1* | 6/2016 | Faridi | G10L 15/32 700/253 |
| 2016/0193732 A1* | 7/2016 | Breazeal | B25J 9/1694 700/258 |
| 2016/0199977 A1* | 7/2016 | Breazeal | B25J 9/1694 700/246 |
| 2017/0206064 A1* | 7/2017 | Breazeal | G06F 8/36 |
| 2018/0131643 A1* | 5/2018 | Trufinescu | G06F 3/048 |
| 2018/0212904 A1* | 7/2018 | Smullen | H04L 67/322 |
| 2018/0365026 A1* | 12/2018 | Jernigan | G06F 9/453 |
| 2019/0034414 A1 | 1/2019 | Kim et al. | |
| 2019/0042564 A1* | 2/2019 | Badr | G06F 9/468 |
| 2019/0074010 A1 | 3/2019 | Horling et al. | |
| 2019/0156831 A1 | 5/2019 | Carbune et al. | |
| 2019/0158433 A1* | 5/2019 | Yun | G06F 3/167 |
| 2019/0172454 A1 | 6/2019 | Kitajima et al. | |
| 2019/0208051 A1 | 7/2019 | Alameh et al. | |
| 2019/0228484 A1* | 7/2019 | Sheppard | H04L 67/24 |
| 2019/0306137 A1* | 10/2019 | Isaacson | G07G 1/0036 |
| 2020/0159502 A1* | 5/2020 | Bodin | G06F 11/302 |
| 2020/0160270 A1* | 5/2020 | Bodin | G06F 11/3438 |
| 2020/0244605 A1* | 7/2020 | Nagaraja | H04L 67/16 |
| 2020/0351227 A1* | 11/2020 | Smullen | H04L 51/04 |
| 2020/0356630 A1* | 11/2020 | Silverstein | G06F 16/3329 |

OTHER PUBLICATIONS

Budiu et al., "Intelligent Assistants Have Poor Usability: A User Study of Alexa, Google Assistant, and Siri", Nielsen Norman Group, Jul. 22, 2018, 14 pages, <https://www.nngroup.com/articles/intelligent-assistant-usability/>.

Doshi, et al., "Artificial Intelligence Chatbot in Android System using Open Source Program—O", International Journal of Advanced Research in Computer and Communication Engineering, vol. 6, Issue 4, Apr. 2017, pp. 816-821.

Kar, et al., "Applying Chatbots to the Internet of Things: Opportunities and Architectural Elements", (IJACSA) International Journal of Advanced Computer Science and Applications, vol. 7, No. 11, 2016, pp. 147-154.

McCormick, James, "Predictions 2017: Artificial Intelligence Will Drive The Insights Revolution Advanced Insights Will Spark Digital Transformation In The Year Ahead", Forrester, Nov. 2, 2016, 9 pages, <https://go.forrester.com/wp-content/uploads/Forrester_Predictions_2017_Artificial_Intelligence_Will_Drive_The_Insights_Revolution.pdf>.

Mell et al., "The NIST Definition of Cloud Computing", National Institute of Standards and Technology, Special Publication 800-145, Sep. 2011, 7 pages.

Shawar, Bayan, "Integrating CALL Systems with Chatbots as Conversational Partners", Computation and Systems, vol. 21, No. 4, 2017, pp. 615-626.

Zhou, et al., "The Design and Implementation of Xiaolce, an Empathetic Social Chatbot", arXiv:1812.08989v1 [cs.HC], Dec. 21, 2018, 26 pages.

* cited by examiner

ARTIFICIAL INTELLIGENCE VOICE RESPONSE SYSTEM HAVING VARIABLE MODES FOR INTERACTION WITH USER

BACKGROUND

The present disclosure relates to Artificial Intelligence (AI) systems which respond to a user query or command, and more particularly, the present disclosure relates to using the AI system for customizing an interaction or response to one or more users.

Artificial Intelligence (AI) based voice response systems, whether on a mobile device or a counter top unit are becoming increasingly popular. Typically, one or more users can interact with an AI device for information (e.g., a question) or to respond to commands, etc., and interact with the AI device to receive information or an action based on the interaction, e.g., question or command.

Interaction with an AI device can include some historical data of questions and answers such as ordering information or general history of queries. However, one issue with current systems includes improving AI interaction with a user or users.

SUMMARY

The present disclosure recognizes the shortcomings and problems associated with current AI systems providing a lack of response options to a querying user or users.

Unlike interactions with chatbots (textual communication), users cannot use text-based interfaces to refer to previous content while interacting with digital assistants. This can present problems in situations where referring to recent information and contexts is beneficial, as in the case of booking travel, when a user would want to compare previous responses.

In one embodiment according to the present invention an AI system or AI voice response system or device analyzes a request from a user, and dynamically determines whether a voice reply is suitable or chatbot interaction is more conductive to the task and responds accordingly.

Interaction with an AI device can be improved in relation to assessing historical data, including a verbal or text based history of previous interactions, to provide contextual responses including information and one or more modes of responding. The historical data can be used for AI response options in responding to a user query.

However, one issue with current systems includes a lack of use of historical data and other available data or information to improve AI interaction with a user or users.

Thereby, the present disclosure provides methods and systems for customizing responses by an Artificial Intelligence (AI) system using a response mode for interaction with a user.

In one aspect according to the present invention, a method for customizing responses by an Artificial Intelligence (AI) system using a response mode for interaction with a user includes receiving a question or command at an AI system from an associated AI device, which in turn, receives the question or command from an initiating user of a plurality of users in a vicinity of the AI device. The method includes determining a preference of an interaction mode for the initiating user, where the preferred interaction mode being determined using a knowledge corpus. The method includes generating an answer to the question or command using the AI system, and initiating, using the AI device, a communication to the initiating user which includes the answer, via a communication mode based on the interaction mode preference of the initiating user.

In another aspect according to the present invention, a system for customizing responses by an Artificial Intelligence (AI) system using a response mode for interaction with a user is disclosed. The computer system includes: a computer processor, a computer-readable storage medium, and program instructions stored on the computer-readable storage medium being executable by the processor, to cause the computer system to: a computer system comprising: a computer processor, a computer-readable storage medium, and program instructions stored on the computer-readable storage medium being executable by the processor, to cause the computer system to: receive a question or command at an AI system from an associated AI device which receives the question or command from an initiating user of a plurality of users in a vicinity of the AI device; determine a preference of an interaction mode for the initiating user, the preferred interaction mode being determined using a knowledge corpus; generate an answer to the question or command using the AI system; and initiate, using the AI device, a communication to the initiating user which includes the answer, via a communication mode based on the interaction mode preference of the initiating user.

In another aspect according to the present invention, a computer program product customizing responses by an Artificial Intelligence (AI) system using a response mode for interaction with a user is disclosed. The computer program product comprising a computer readable storage medium having program instructions embodied therewith, wherein the computer readable storage medium is not a transitory signal per se, the program instructions executable by a computer to cause the computer to perform a method, comprising: receiving a question or command at an AI system from an associated AI device which receives the question or command from an initiating user of a plurality of users in a vicinity of the AI device;

determining a preference of an interaction mode for the initiating user, the preferred interaction mode being determined using a knowledge corpus; generating an answer to the question or command using the AI system; and initiating, using the AI device, a communication to the initiating user which includes the answer, via a communication mode based on the interaction mode preference of the initiating user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Figure 1:
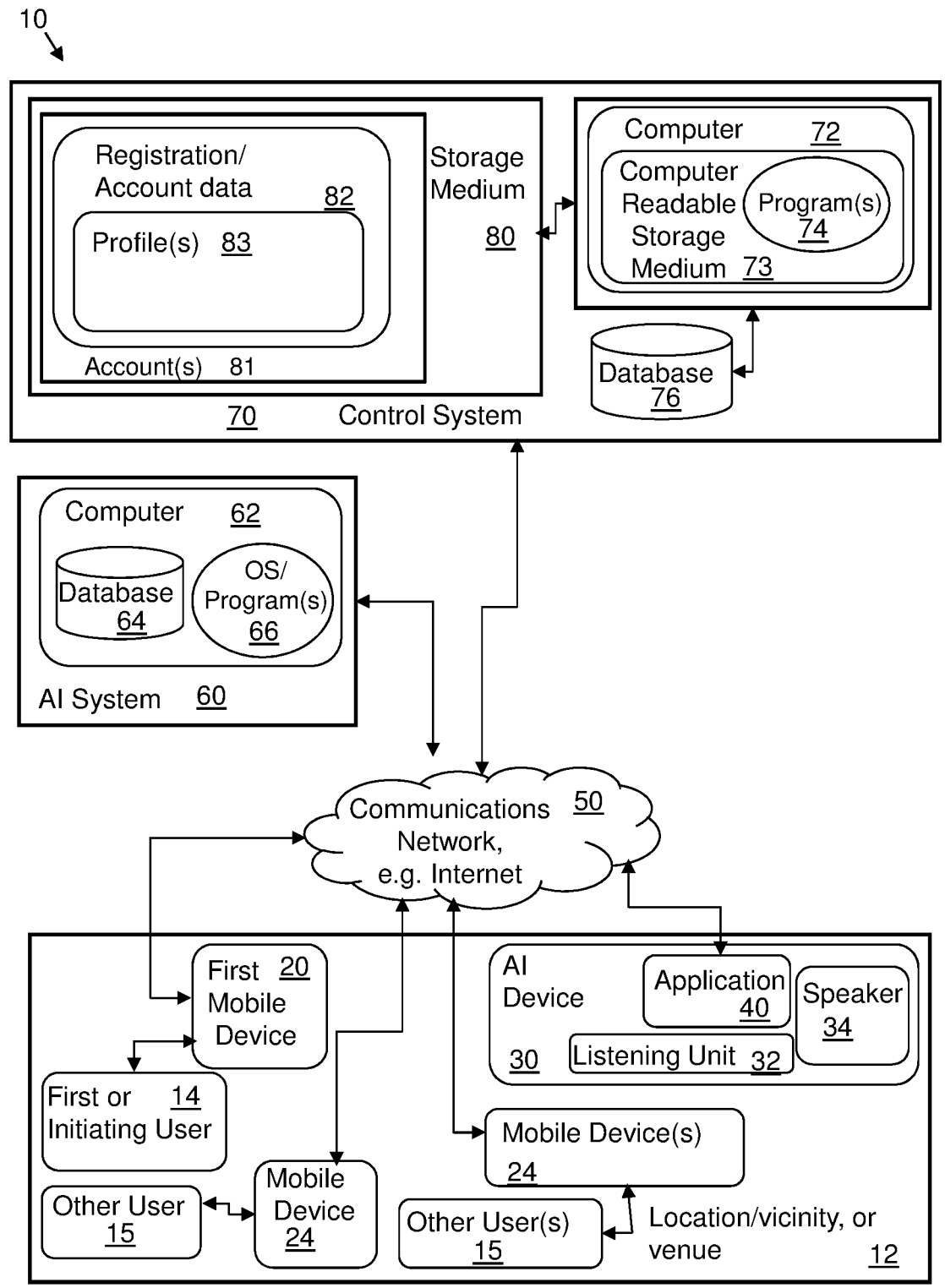
FIG. 1 is a schematic block diagram illustrating an overview of a system and methodology for customizing responses by an Artificial Intelligence (AI) system using a response mode for interaction with a user, according to an embodiment of the invention.
Figure 2:
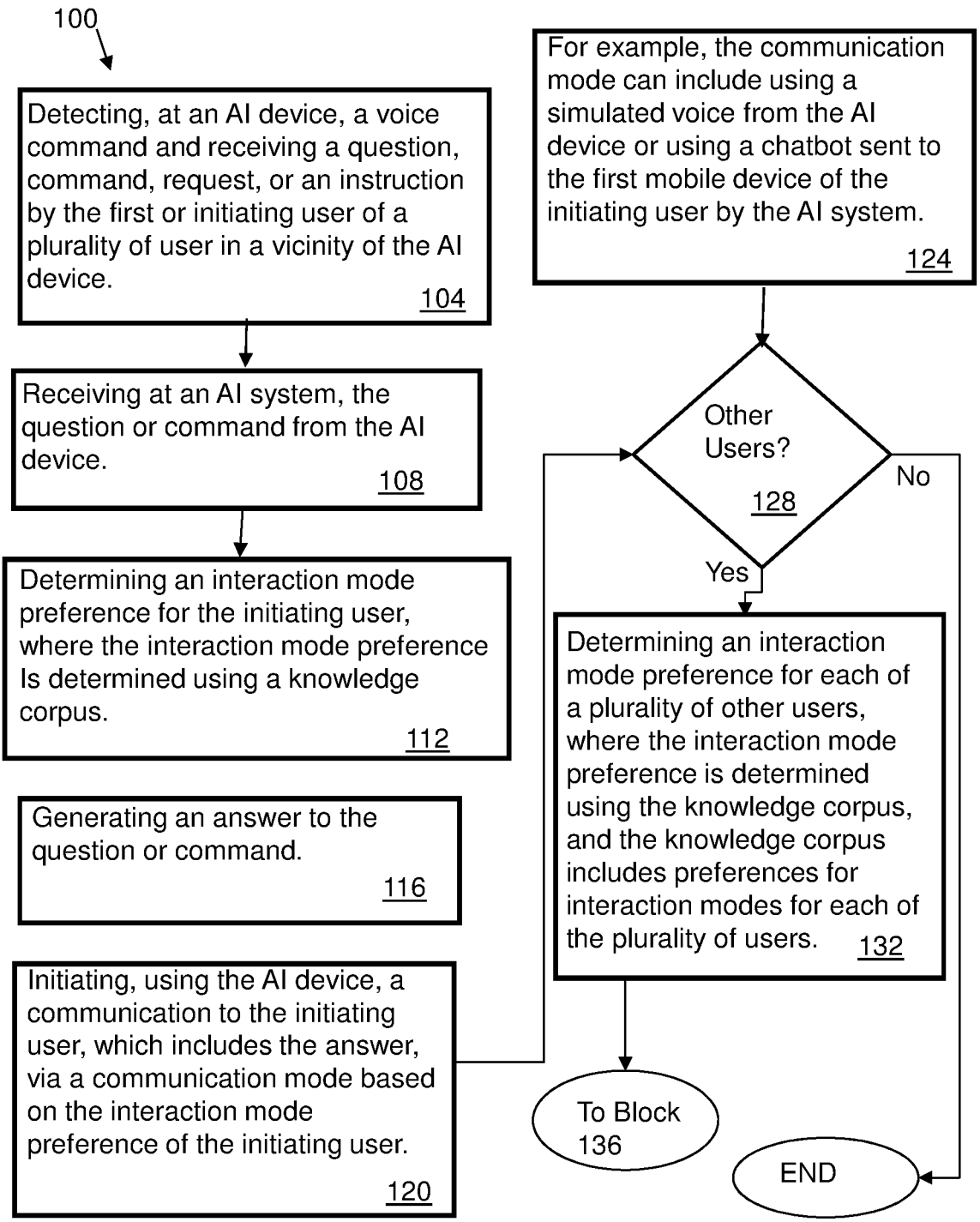
FIG. 2 is a flow chart illustrating a method, implemented using the system shown in FIG. 1, for customizing responses by an Artificial Intelligence (AI) system using a response mode for interaction with a user, according to an embodiment of the present invention.
Figure 3:
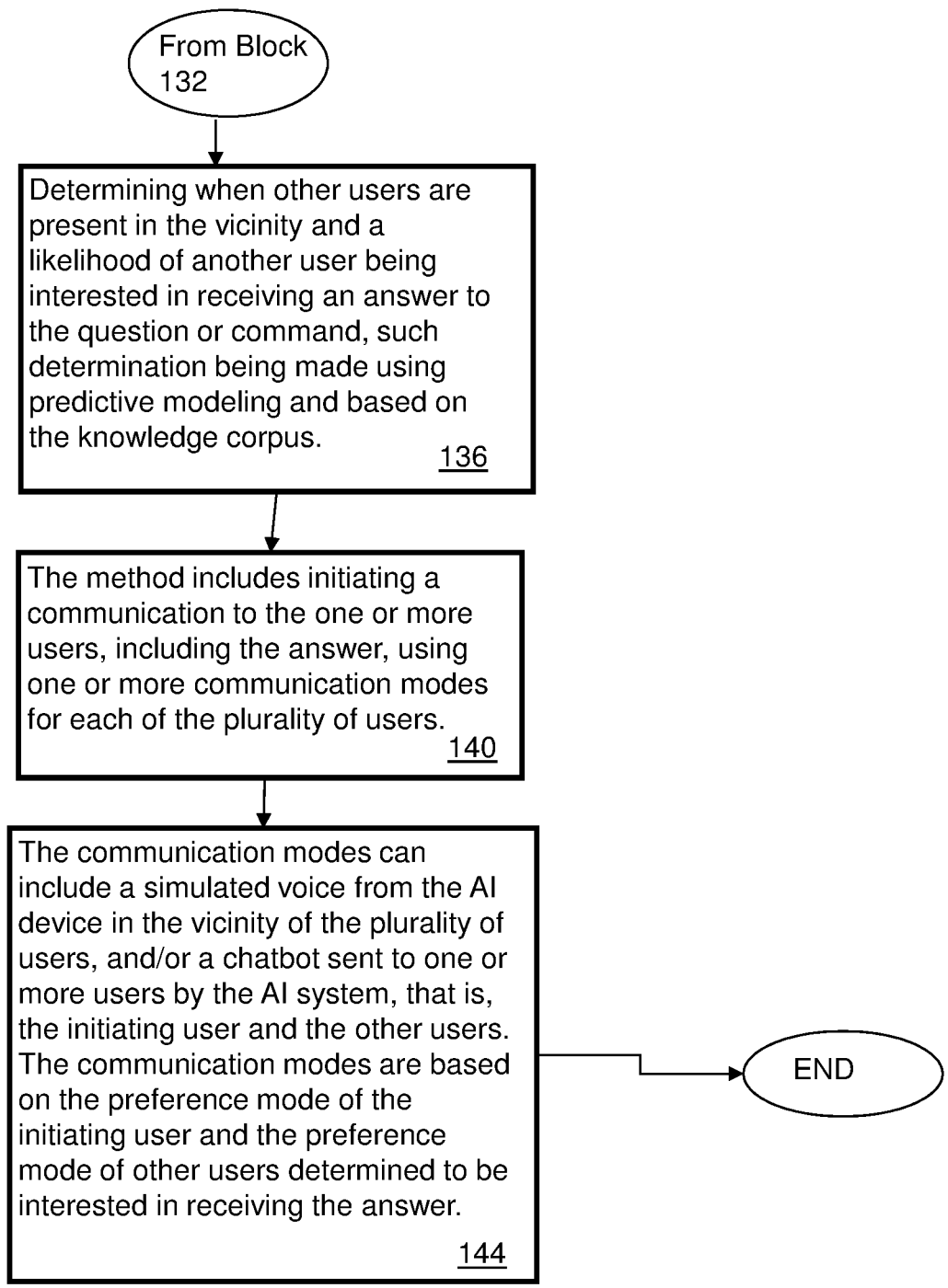
FIG. 3 is a continuation of the flow chart shown in FIG. 2.

Referring to FIGS. 1 and 2, a method 100 (FIG. 2) with reference to a system 10 (FIG. 1) according to an embodiment of the present disclosure is provided for customizing a response or interaction mode by an Artificial Intelligence (AI) system and AI device, using a (or based on) a response mode for a user for interaction with the user. In one embodiment according to the present disclosure, an AI device 30, mounted or free standing, belonging to a first user (also referred to as an initiating user) communicates with an AI system 60. The AI device can be always active and/or activated by voice commands, that is, the AI device listens, using a listening unit 32, e.g., a microphone, for a specific voice command, such as "hello 'blank'" or "hello 'device name'". The AI device can also include a speaker 34 for transmitting an audible reply, such as a voice simulation. The AI system 60 can operate on a specific or proprietary AI platform, wherein the platform enables the AI system and associated AI devices to communicate.

In one embodiment, an AI device can be a mobile device which accesses an AI system, for example, via the Internet. In this example, the vicinity or location would be a location of the mobile device and the vicinity would be an area around the mobile device, such as the area within audible range of the device.

Figure 4:
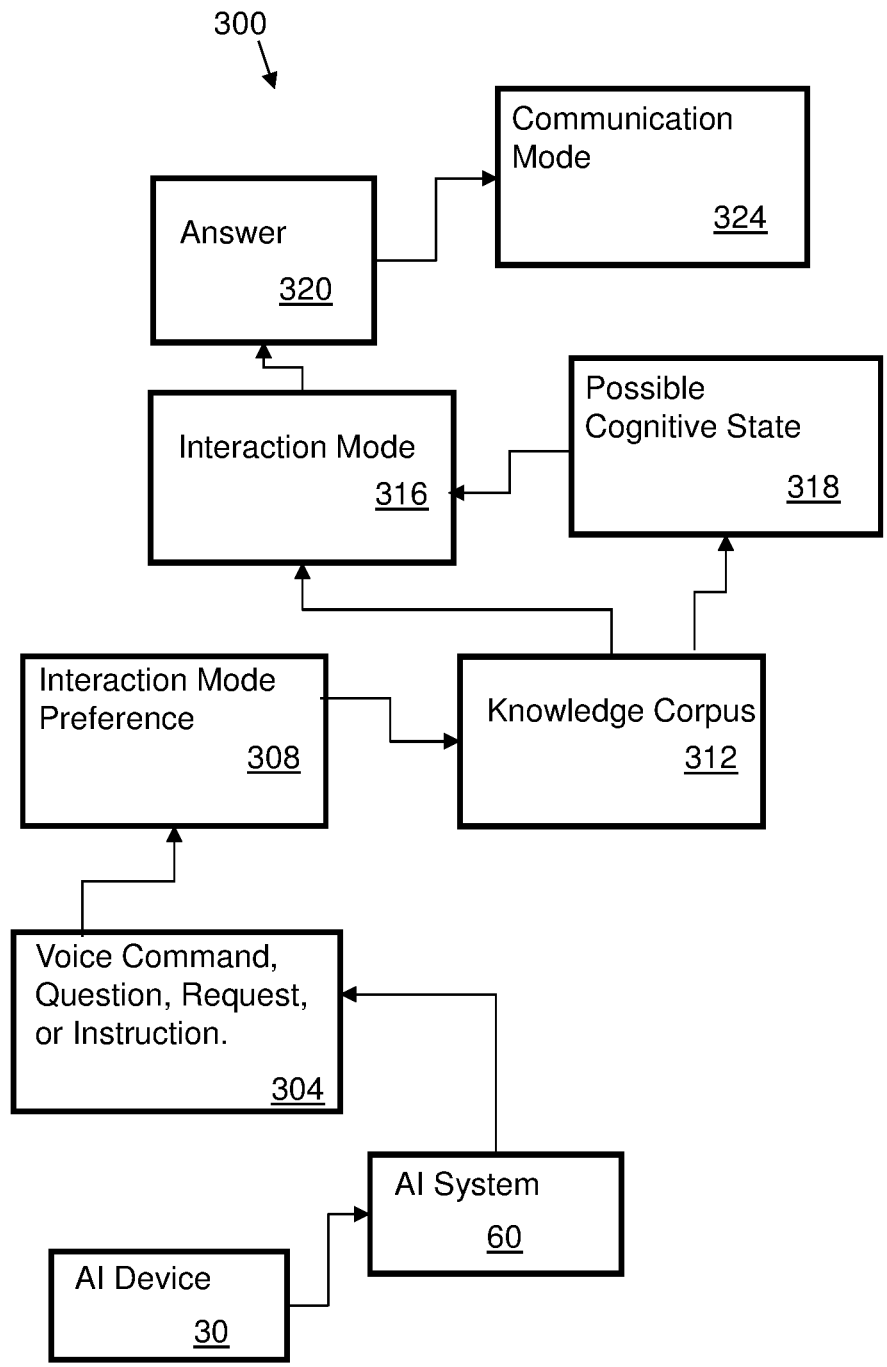
FIG. 4 is a functional block diagram for instructional purposes illustrating features of the present invention in association with the embodiments shown in FIGS. 1, and 2 and 3, for customizing responses by an AI system using a response mode for interaction with a user.

Also, referring to FIG. 1, the AI system 60 includes a computer 62, database 64, and operating systems and programs 66. Referring to FIGS. 1 and 2, the method and system includes being capable of detecting and identifying devices belonging to the first user 14 and a plurality of other users 15 in a location or venue 12. The devices can electronically communicate and interact with the AI system 60 via the AI device 30. Referring to FIG. 1, the user 14 in the location 12 can ask a question 304 (see FIG. 4), make a request, or give an instruction, audibly, to the AI device 30.

In the present example, a first user 14 and multiple other users 15 are shown for illustration, however, other users can be at the location. Other user devices, other than a mobile device can include, for example, a computer, a laptop computer, or a desktop computer, or a tablet having a computer. In one example, a first user 14 can have a first mobile device 20. In another example, other users 15 can have associated mobile devices 24.

A control system is in communication with the AI device and an application 40. In another example, a plurality of users can be at the location 12 and one or more users can ask a question. The AI device 30 communicates with the AI system 60 and the control system 70 using a communications network 50 (e.g. the Internet).

Also, referring to FIG. 1, a user's electronic device, e.g., a mobile device 20 can include a computer, computer readable storage medium, and operating systems, and/or programs, and/or a software application. These features are shown generically herein in FIG. 6 referring to one or more computer systems 1010.

The method 100 according to an embodiment of the present disclosure, can be incorporated in one or more computer programs or an application and stored on an electronic storage medium. It is envisioned that the application can access all or part of instructions necessary to implement the method of the present disclosure. The program or application can communicate with a remote computer system via a communications network 50, e.g., the Internet, and access data, and cooperate with program(s) stored on the remote computer system.

In the embodiment of the disclosure shown in FIGS. 1 and 2, the method 100 is incorporated in an application 40 stored on the AI device 30. The application can communication with a control system 70 via the communications network 50. The control system 70 includes a computer 72 having a database 76 and one or more programs 74. In the embodiment of the disclosure shown in FIG. 1, the application 40 communicates with the control system 70 and the one or more programs 74 stored on a computer readable storage medium 73. The control system includes the computer 72 which also has access to the database 76. The control system 70 includes a storage medium 80 for maintaining a registration 82 of users and their devices for collaboration with the AI system 60. Such registration can include user profiles 83, which can include user data supplied by the users in reference to registering and setting-up an account. In an embodiment, the method and system which incorporates the present disclosure includes the control system (generally referred to as the back-end) in combination and cooperation with a front end of the method and system, which can be the application. The application is stored on a device, for example, the AI device 30, and can access data and additional programs at a back end of the application, e.g., control system 70.

In one embodiment of the present disclosure, the control system 70 includes a storage medium 80 for maintaining a registration and account data 82 of accounts 81. The registration and account data 82 can include associated profiles 83. The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the AI device, as in the example shown in FIG. 1 of AI device 30 having the application 40. The application 40 is stored on the AI device 30 and can access data and additional programs at the back end of the application, for example, in the program(s) 74 stored in the control system 70.

The program(s) 74 can include, all or in part, a series of executable steps for implementing the method of the present disclosure. A program, incorporating the present method, can be all or in part stored in the computer readable storage medium on the control system or, in all or in part, on an AI device 30. It is envisioned that the control system can not only store the profile of users, but in one embodiment, can interact with a website for viewing on a display of a device using the Internet, and receive user input related to the method and system of the present disclosure. It is understood that FIG. 1 depicts one or more profiles 83, however, the method can include multiple profiles, users, registrations, etc. It is envisioned that a plurality of users or a group of users can register and provide profiles using the control system for use according to the method and system of the present disclosure.

Regarding any collection of data with respect to the present disclosure, such uploading or generation of profiles is voluntary by the one or more users, and thus initiated by and with the approval of a user. Thereby, a user can opt-in to establishing an account 81 having a profile 83 according to the present disclosure. Such approval also includes a user's option to cancel such profile or account, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner.

It is also understood that the method 100 according to an embodiment of the present disclosure, can be incorporated into (Artificial Intelligence) AI devices, which can communicate with respective AI systems, and respective AI system platforms. Thereby, such programs or an application incorporating the method of the present disclosure, as discussed above, can be part of an AI system. In one embodiment according to the present invention, it is envisioned that the control system can communicate with an AI system, or in another example can be part of an AI system. The control system can also represent a software application having a front-end user part and a back-end part providing functionality, which can in one or more examples, interact with, encompass, or be part of larger systems, such as an AI system. In one example, the AI device 30 is associated with an AI system 60, remote from the AI device. Such an AI system can be represented by one or more servers storing programs on computer readable medium which can communicate with one or more AI devices.

Referring to FIG. 2, the method 100, using the system 10, detects a voice command, and/or receives a question, command, request, or an instruction 304 (see FIG. 4) by the first or initiating user 14 of a plurality of users in a vicinity 12 of the AI device 30, as in block 104. In one example, the AI device 30 detects and receives an audible question by a user, or a wake-up command to the AI device. The AI device can activate upon detecting a voice command at its listening unit 32. In response to detecting the voice command and activating, the AI device receives the question or command by the user.

It is understood that as discussed herein, when the present disclosure refers to 'a question' or 'a question or command', or 'instruction', etc., it is intended to include, and not exclude, requests, instructions, and other types of voice activation, but for the sake of expediency the disclosure is referring to a question or command as generic and inclusive of other audible instruction or interactions. In one example, the first user uses a first mobile device 204, which can be used, with consent and permission of the user, to detect a location of the first mobile device and thereby the location of the user.

The method includes receiving a question or command at an AI system from an associated AI device which received the question or command from the initiating user of a plurality of users in a vicinity 12 of the AI device 30, as in block 108.

The method includes determining an interaction mode preference 308 (see FIG. 4) for the initiating user. It is understood that an interaction mode and a response mode are used interchangeably. The interaction mode preference is determined using a knowledge corpus 312 (see FIG. 4), as in block 112. The knowledge corpus 312 includes one or more preferences for one or more interaction modes 316 (see FIG. 4) for the initiating user.

The method includes generating an answer to the question or command using the AI system, as in block 116.

The method includes initiating a communication to the initiating user, including the answer, via a communication mode by the AI device based on the interaction mode preference of the initiating user, as in block 120.

The communication mode can include using an audible transmission or reply, such as, a simulated voice from the AI device, or using a chatbot sent to the first mobile device of the initiating user by the AI system, as in block 124, based on the preference mode of the initiating user. In another embodiment, the communication mode includes the AI system sending a text and/or a chatbot to the first device of the initiating user.

In another example, the interaction mode preference of the initiating user can include a time and/or location for one communication mode, and a time and/or a location for another communication mode.

Another Embodiment

Referring to FIG. 2, the method 100 continues and includes in one embodiment according to the present disclosure determining that other users are not present in the vicinity, at block 128, after which, the method continues to end. When the method determines that other users are present in the vicinity, at block 128, the method continues to block 132. The method includes determining an interaction mode preference for each of a plurality of other users, as in block 132.

The interaction mode preference 308 is determined using the knowledge corpus, and the knowledge corpus includes preferences for interaction modes 316 for each of the plurality of users.

The method can determine when one or more of a plurality of users are in a venue/vicinity or location by detecting the location of the one or more users' devices, for example, using GPS (Global Positioning System(s)) and/or using micro-location technologies or services. The GPA and micro location services can be used to detect the one or more user's devices and thereby the user's location.

Further, the plurality of users can allow, that is consent to, detecting the location of their respective devices, and can allow and/or consent to the storing of input data including interaction mode preferences. Such data can be transferred or entered by the user using their respective devices and uploaded to the control system and stored in respective accounts 81 which can include registration data 82 and profiles 83 for each user. It is understood that all data is to be securely stored and only used for intended purposes approved by the users. And further, the users have the option to decline services and remove all data which will be disposed of securely.

The method includes determining when other users are present in the vicinity and a likelihood of another user being interested in receiving an answer 320 (see FIG. 4) to the question or command, such determination being made using predictive modeling and based on the knowledge corpus, as in block 136. The users can be determined to be interested in receiving an answer to the question or command by the method and system analyzing the knowledge corpus for historical data of usage of each users', and historical data of questions asked and interest in topics by each user, and using profile data, to determine a user's interest level in a topic, and for preference for receiving an answer. A threshold can be set and a determination made when a user's interest level in a topic meets or exceed the threshold.

The method includes initiating a communication to the one or more users, including the answer, using one or more communication modes 324 (see FIG. 4) for each of the plurality of users, as in block 140. The communication modes can include a simulated voice from the AI device in the vicinity of the plurality of users, and/or a chatbot sent to the respective devices of the one or more users by the AI system, that is, the initiating user and the other users. The communication modes are based on the preference mode of the initiating user and the preference mode of other users determined to be interested in receiving the answer, as in block 144.

In another example, the AI system sends a text and/or a chatbot to each of one or more devices of respective users of the plurality of users, in response to the determining of the preference mode for the other users of the plurality of user. Further, when the other users are determined to be interested in receiving the answer to the question or command, the AI system sends the text and/or chatbot.

Other Features of the Present Disclosure

The method and system further includes developing a knowledge corpus for a plurality of users of an AI system. The knowledge corpus includes preferences for each of the users, such preferences can include whether a user prefers voice responses, chatbot responses, or text responses. In another example, the user can prefer a combination of response modes or communication modes. Also, in another example, preference can indicate that a user prefers a communication mode at one location and a different communication mode at another location, and in another example the preference can be based on a time of day and/or a day. For example, a user can prefer one communication mode on certain day or days, or at a certain time or times of day, or at a combination of a certain day and time.

The method and system where the determination is made using predictive modeling includes and is based on the knowledge corpus, and can include, in one example, analyzing historical data for one or more users in the knowledge corpus. The analysis can be used for predicting the likelihood of a user being interested in being communicated information, for example, the information including a topic or issue regarding a question, or answer.

Other Examples and Embodiments

In one generalized operational example, the method and system of the present disclosure aggregates data for interactions with an AI device for each user. The aggregation of data can include a user's voice request and assessing a level of understandably of a voice reply, for example, if a user asks the same question multiple times the system can conclude the user is not or not fully understanding the answer provided. In another example that can be used for assessing a level of understanding, a pattern of interaction can be evaluated, such as if a user asks for the AI device to reply slowly and/or with more detail.

In another example, a user's cognitive state can be assessed by evaluating biometric, facial recognition pattern, or voice pattern interaction. For example, with the consent and authorization of users, an AI system can use biometric feedback, and/or changes in facial expressions, and/or changes in voice patterns to assess a user's understanding of an AI interaction. Such assessment of understanding can assist the AI system in ascertaining a mode of communication for a reply. In one example, if the AI system concludes a lack of understanding by a user to a voice reply, the AI system can offer to, or switch to, sending a text reply, or offer more information in a text or audibly using a voice simulation.

Other example of data that can be used to generate a personalized user knowledge corpus includes: topics of interaction (e.g., travel booking vs. weather data); how a reply from a AI voice response system is related to other people in the surrounding vicinity; a user's subsequent actions after receiving a voice reply, e.g., searching additional detail in a search engine or asking the AI device for more information on a topic; and contextual information, e.g., a noisy surrounding area or environment, or a change in location.

The AI system can use machine learning to develop a knowledge corpus by correlating a topic of discussion, a user's cognitive state with a mode of communication with the user, to determine a communication mode, for example, a voice response or chatbot interaction.

The present method and system includes response amelioration when a question is asked to an AI voice response system. In responding to the user, the AI system analyzes a current cognitive state of the user, including if a user can remember and correlate all the reply from Voice response system. The method and system predicts if other users/people present in the surrounding area might be interested in getting the response. The method and system includes predicting if a user needs to analyze the response, or visualize the response before making any decision. The method and system can also ameliorate the response based on if the voice response system is requiring time for a calculation, or to assess data for a response. The AI system uses the knowledge corpus to identify if a user should be responded by an AI based voice response system or an AI voice response system should deliver a chatbot link to a user's mobile device for chatbot interaction.

When the AI system identifies that a user should have a chatbot interaction for a current contextual situation and the topic of interaction, the AI device can identify an appropriate knowledge corpus section for the user, and accordingly the AI system can dynamically create a chatbot and a chatbot link will be delivered to the user to initiate chat interaction.

In one example, when an AI system predicts that user/people present in the surrounding area are also interested to know the user's interaction with the AI device, and in one example, the AI system can determine a chatbot interaction to be ideal, the AI system can invite other people to join in the same chatbot. Alternatively, an AI device voice response system can narrate the discussion with the chatbot for the benefit of all user present in the area.

In another embodiment, according to the present systems and methods of the present disclosure the AI voice response system can link a user and screen-capable device of the user, thereby a device-user mapping for multiple users can be obtained to initiate chatbot interactions. An AI voice response system of the AI device can gather voice interaction patterns with the user over time, including: topics of requests; repetition of requests (e.g., a user asking to repeat a response to validate understanding); requests for explanation of responses; cognitive states of users (e.g., some users' understanding could be slower due to lack of experience with language or topic subject matter); contextual analysis of the voice reply (e.g., a voice response has logic, conditions, or calculations); interest of other users in the system interactions; surrounding context, (e.g., noisy environment); reaction to responses (e.g., using a search engine to obtain more information).

The method and system can determine a possible cognitive state of a user wherein a possible cognitive state of the user can be identified by analyzing feedback parameters, for instance, biometric data, facial/body language, or tone of a user's voice. Using the feedback parameters and the knowledge corpus, an AI generated predictive model of a possible cognitive state of a user can be generated.

More specifically, the AI voice response system can analyze a user's reaction to voice responses and validate if the user's subsequent action is related to the response from an AI voice response system so that it can determine the accuracy of the response and method of delivery. Machine learning can be performed on the gathered data to create a knowledge corpus by correlating topic of discussion, effectiveness of AI based voice interaction, user's cognitive state, number of people interested, and the reactions of the users using predictive modeling and based on the knowledge corpus, as in block 136. Such predictive analysis can result in ascertaining a possible cognitive state 318, or a probable cognitive state of a user.

The knowledge corpus can contain information about the other users or secondary users, for example, their relative interest in certain topics, and use predictive modeling to determine whether the request, and the response or answer, dealing with tangential subjects would be of interest to the user. For example, if a secondary user has expressed interest about a particular sports team, the system can predict that they would be interested in other sports teams in the city or in a vicinity of the particular sports team. The system can learn from the user's feedback whether it was accurate in making these predictions. Thus, in this example, the user's possible cognitive state would be that the user is interested in other sports teams in the area.

When any voice request is submitted, then AI system will analyze the voice request contextually to validate: topic(s), if appropriate to the voice response or chatbot; a user's cognitive state, if user's predicted understandability is appropriate to voice interaction and can correlate previous discussion; surrounding context; and a number of interested users. The AI system factors in the above parameters to identify if for the topic of discussion, AI voice response is appropriate or chatbot is appropriate. This can be achieved using a weighted decision calculation.

If the AI system identifies that a voice response is best for the situation, then the AI voice response system or AI device responds to the user. If the AI system identifies that voice response is not suitable, the AI system device will initiate a chatbot interaction with the user. The AI system sends an appropriate chatbot link as a response and will apply its knowledge corpus for the discussion.

When there are multiple participants, the AI system analyzes the users/people in the vicinity to ascertain their level of interest on the topic of interaction and to predict if these supplemental users are also interested to know the response if delivered by chatbot.

In one example, a user's possible cognitive state can be assessed by evaluating biometric, facial recognition pattern, or voice pattern interaction. For example, with the consent and authorization of users, an AI system can use biometric feedback, and/or changes in facial expressions, and/or changes in voice patterns to assess a user's understanding of an AI interaction. The facial data and voice data can be gathered using a camera and a microphone, respectively. Such assessment of understanding can assist the AI system in ascertaining a mode of communication for a reply. In one example, if the AI system concludes a lack of understanding by a user to a voice reply, the AI system can offer to, or switch to, sending a text reply, or offer more information in a text or audibly using a voice simulation.

Predicting or ascertaining a possible cognitive state of a user can include assessing the mental alertness, focus, distraction, multi-tasking, and/or impairment levels of the user to aid in consuming the requested information, which can be ascertained using the assessments aforementioned. For example, the AI system might detect that the user has just woken up based on analysis of the vocal request (compared to historical data—listening for hoarseness, coughing) and determine that visual rendering of the requested information is more beneficial when the user is in a tired state. In another example, if the system detects that the user is distracted, it might respond audibly, but send follow up text-based information.

In one example, an AI device voice response system can narrate the interaction between the user and chatbot and accordingly other users in the vicinity will also be able to hear the interaction, or alternatively, it could deliver the chatbot link to all participants if the user-device mapping is available.

In one operational example, a first user (user 1) can be working on researching a complex business trip to Alaska and asks the AI device for the best hotels with availability for the first week of June in Anchorage, Ak. The device responses by explaining there are multiple options and that it is sending the list of hotels to the user's tablet device. Another user (user 2) is sitting in the conference room with the first user, and the system knows and understands this based the other user's voice previous exchanges and that the other user's smartphone is registered (validated) with the system. The system also supplies the results to the other user, as the other user is working on the same business trip and needs to understand the options for the hotel to help find lodging for the entire project team that will be traveling to Alaska. The system can explain a final response as an assembly—that is, "user 1 and user 2, I've found 5 hotels in Anchorage, Ak. that meets your requirements, but only 3 of them show availability on a travel booking site . . . I'm sending these 3 options to your user 1's phone and user 2's tablet. Please let me know if I'm able to book something for you."

In another operational example, a first user enjoys keeping up with the current local weather throughout the day, but likes to have further details sometimes about the weekly extended forecast. The first user asks the AI device for the local weather where they reside in North Carolina. The AI system communicates that it is going to be Sunny today with a high of 55 degrees Fahrenheit, with a low temperature of 39 degrees tonight. Winds are out of the southwest at about 15 mph. The first user wonders if a cold front is coming in. The first user asks the AI device if a cold front weather system is in the forecast and the system responds with the 7 day forecast, but sends it to the first user's mobile phone as there is a wealth of information that would be too complex to be communicated using an audio interface. Meanwhile, a second user enters the area and mentions they are traveling next week to Florida. The second user interrupts the exchange and tells the AI device (e.g., digital assistant), they are traveling this week to Orlando, Fla., so an extended weather forecast for that city for the next week is desirable. The AI system supplies the 7 days forecast for Orlando, Fla. to both the first and second user via their respective devices.

Figure 5:
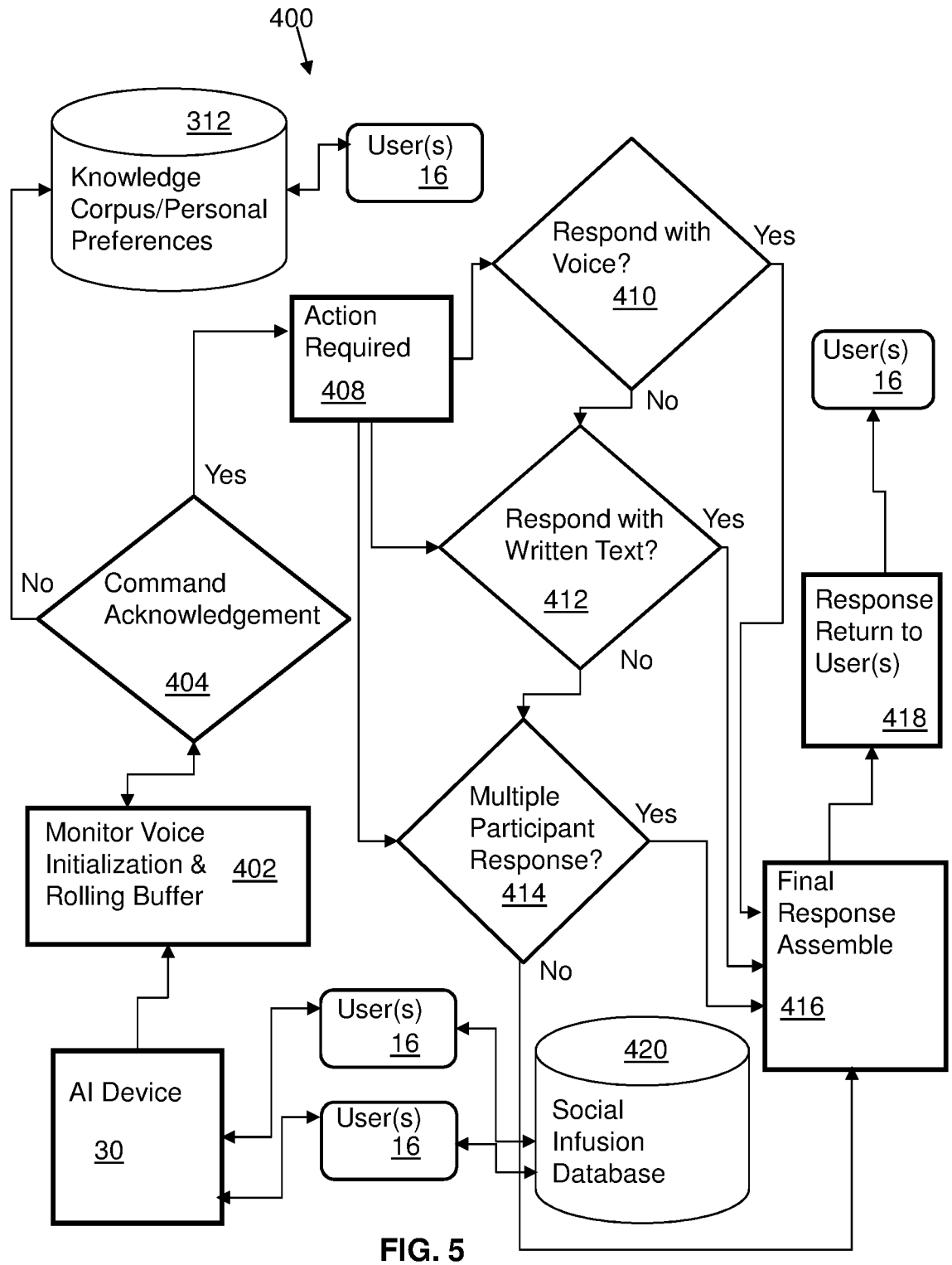
FIG. 5 is a functional block diagram for instructional purposes illustrating another embodiment according to the present disclosure illustrating features of the present invention in association with the embodiments shown in FIGS. 1, 2 and 3, for customizing responses by an AI system using a response mode for interaction with a user.

Referring to FIG. 5, in another operational example of a method and system according to the present disclosure, an AI device 30 monitors voice initialization 402 by one or more users 16 (for example including the first user 14 and other users 15). The multiple users 16 can have data sored in a social infusion database 420 which includes secondary users and their respective history or historical data. The users 16 can include a primary user or primary users which also have historical data stored in a knowledge corpus 312 including personal preferences. If a command acknowledgment is not detected the system continues to populate or update the knowledge corpus 312 with user data. If a command acknowledgement is detected the system continues to an action 408. One action can include responding with a voice 410. Another action can include responding with a written text 412. Another action can include responding for multiple participants 414. All the responses are assembled in a final response 416. The final response is returned 418 to the users 16.

The flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
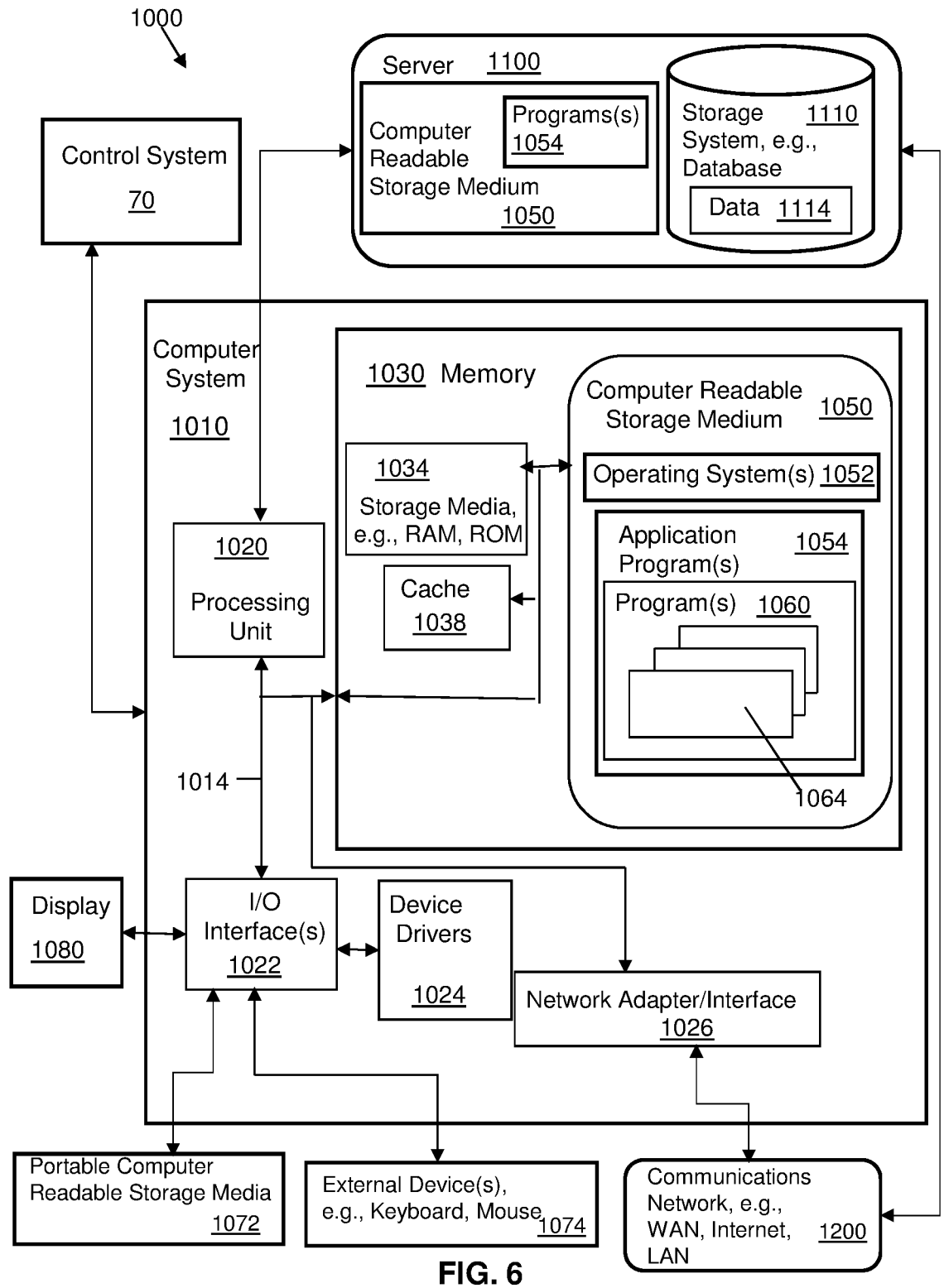
FIG. 6 is a schematic block diagram depicting a computer system according to an embodiment of the disclosure which may be incorporated, all or in part, in one or more computers or devices shown in FIG. 1, and cooperates with the system and methods shown in FIGS. 1-5.

Referring to FIG. 6, a system or computer environment 1000 includes a computer system 1010 shown in the form of a generic computing device. The method 100, for example, may be embodied in a program 1060, including program instructions, embodied on a computer readable storage device, or computer readable storage medium, for example, generally referred to as memory 1030 and more specifically, computer readable storage medium 1050. Such memory and/or computer readable storage media can include non-volatile memory or non-volatile storage. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that the control system 70 can include all or part of the computer system 1010 and its components, and/or the control system can communicate with all or part of the computer system 1010 and its components as a remote computer system, to achieve the control system functions described in the present disclosure. It is also understood that the one or more computers or computer systems shown in FIG. 1 similarly can include all or part of the computer system 1010 and its components, and/or the one or more computers can communicate with all or part of the computer system 1010 and its components as a remote computer system, to achieve the computer functions described in the present disclosure.

One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Figure 7:
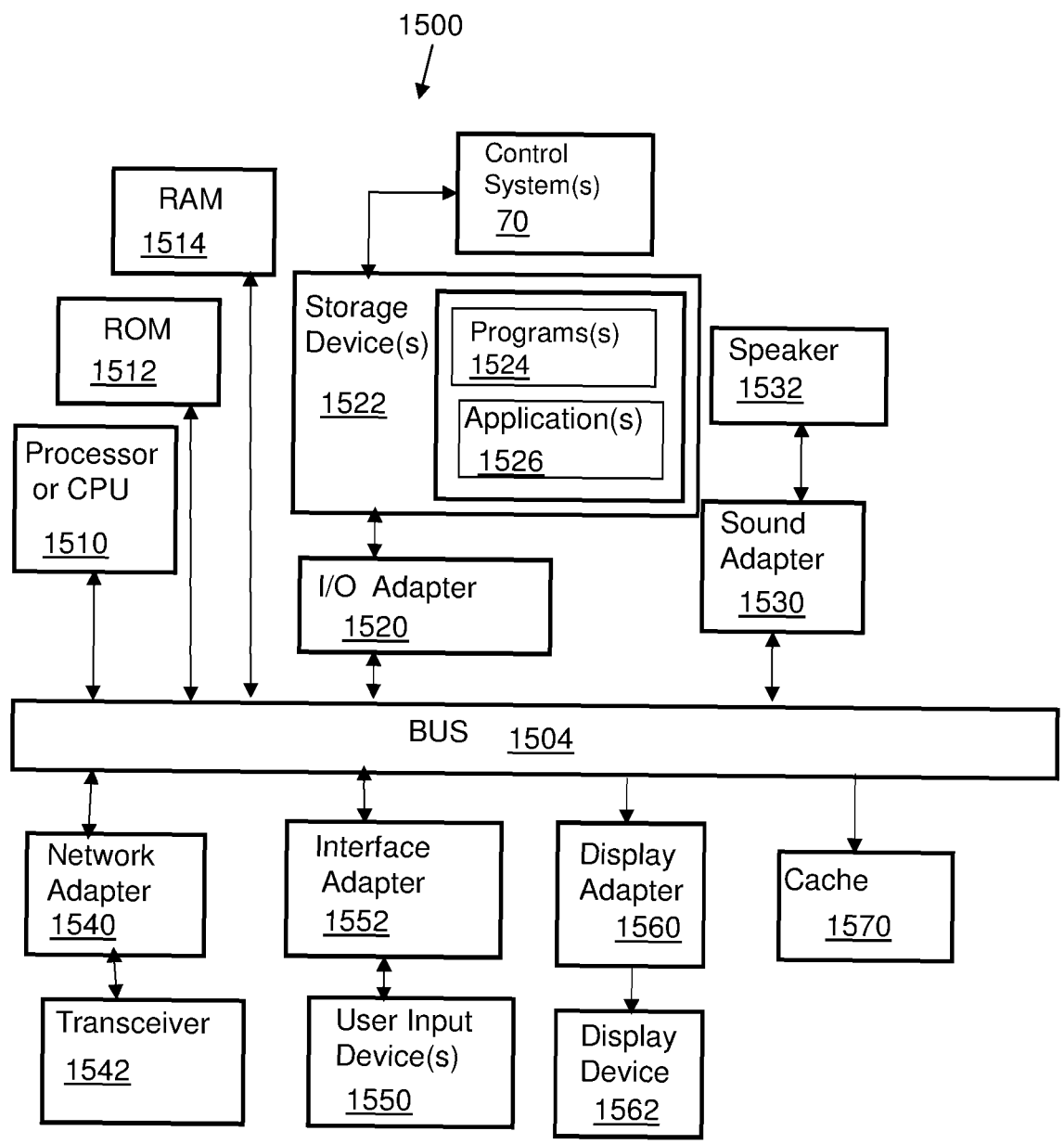
FIG. 7 is a schematic block diagram of a system depicting system components interconnected using a bus. The components for use, in all or in part, with the embodiments of the present disclosure, in accordance with one embodiment of the present disclosure.

Referring to FIG. 7, an example system 1500 for use with the embodiments of the present disclosure is depicted. The system 1500 includes a plurality of components and elements connected via a system bus 1504 (also referred to as a bus). At least one processor (CPU) 1510, is connected to other components via the system bus 1504. A cache 1570, a Read Only Memory (ROM) 1512, a Random Access Memory (RAM) 1514, an input/output (I/O) adapter 1520, a sound adapter 1530, a network adapter 1540, a user interface adapter 1552, a display adapter 1560 and a display device 1562, are also operatively coupled to the system bus 1504 of the system 1500.

One or more storage devices 1522 are operatively coupled to the system bus 1504 by the I/O adapter 1520. The storage device 1522, for example, can be any of a disk storage device (e.g., a magnetic or optical disk storage device), a solid state magnetic device, and so forth. The storage device 1522 can be the same type of storage device or different types of storage devices. The storage device can include, for example, but not limited to, a hard drive or flash memory and be used to store one or more programs 1524 or applications 1526. The programs and applications are shown as generic components and are executable using the processor 1510. The program 1524 and/or application 1526 can include all of, or part of, programs or applications discussed in the present disclosure, as well vice versa, that is, the program 1524 and the application 1526 can be part of other applications or program discussed in the present disclosure. The storage device can communicate with the control system 70 which has various functions as described in the present disclosure.

A speaker 1532 is operatively coupled to system bus 1504 by the sound adapter 1530. A transceiver 1542 is operatively coupled to system bus 1504 by the network adapter 1540. A display 1562 is operatively coupled to the system bus 1504 by the display adapter 1560.

One or more user input devices 1550 are operatively coupled to the system bus 1504 by the user interface adapter 1552. The user input devices 1550 can be, for example, any of a keyboard, a mouse, a keypad, an image capture device, a motion sensing device, a microphone, a device incorporating the functionality of at least two of the preceding devices, and so forth. Other types of input devices can also be used, while maintaining the spirit of the present invention. The user input devices 1550 can be the same type of user input device or different types of user input devices. The user input devices 1550 are used to input and output information to and from the system 1500.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
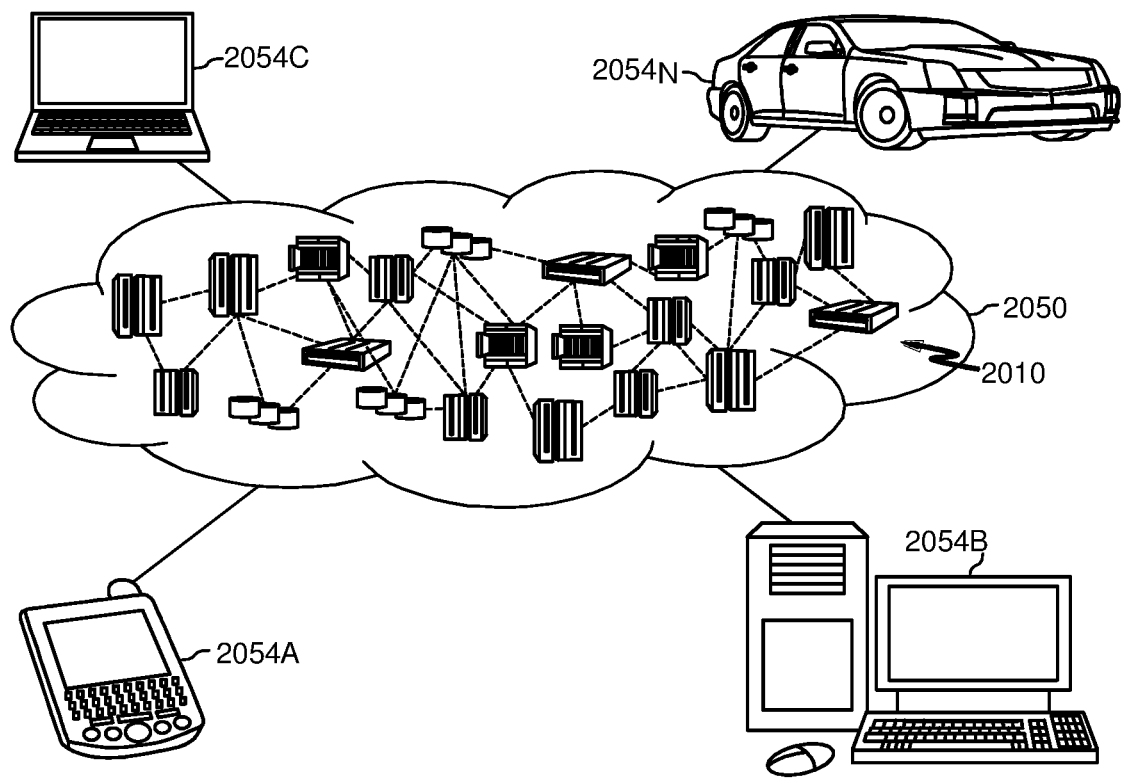
FIG. 8 is a block diagram depicting a cloud computing environment according to an embodiment of the present invention.

Referring now to FIG. 8, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 8 are intended to be illustrative only and that computing nodes 2010 and cloud computing environment 2050 can communicate with any type of computerized device over any type of network and/or network addressable connection (e.g., using a web browser).

Figure 9:
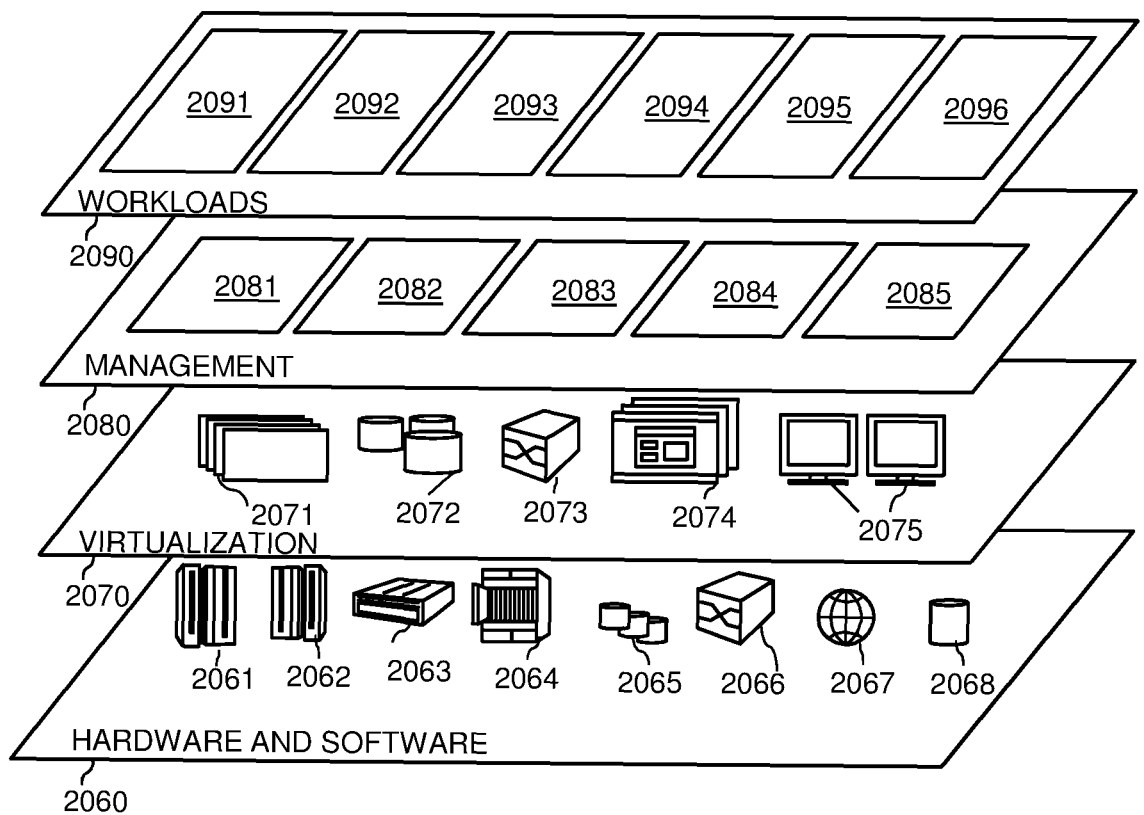
FIG. 9 is a block diagram depicting abstraction model layers according to an embodiment of the present invention.

Referring now to FIG. 9, a set of functional abstraction layers provided by cloud computing environment 2050 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075. In one example, management layer 2080 may provide the functions described below.

Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and customizing responses by an AI system using a response mode for interaction with a user 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for customizing responses by an Artificial Intelligence (AI) system using a response mode for interaction with a user, comprising:
   receiving a question or command at an AI system from an associated AI device which receives the question or command from an initiating user of a plurality of users in a vicinity of the AI device;

determining a preference of an interaction mode for the initiating user, the preferred interaction mode being determined using a knowledge corpus;

generating an answer to the question or command using the AI system;

initiating, using the AI device, a communication to the initiating user which includes the answer, via a communication mode based on the interaction mode preference of the initiating user;

determining a preference mode for another user of the plurality of users, the preference mode being determined using the knowledge corpus, and the knowledge corpus includes preferences for the another user;

determining when a likelihood of the another user being interested in receiving an answer to the question or command meets or exceeds a threshold for receiving an answer, the determination using predictive modeling and being based on the knowledge corpus; and initiating a communication including the answer, using a communication mode for the another user based on the preference mode for the another user, in response to the determining of the another user being interested in receiving the answer.

2. The method of claim 1, wherein the communication mode includes a simulated voice from the AI device, or using a chatbot sent to a first device of the initiating user by the AI system.

3. The method of claim 1, wherein the communication mode includes the AI system sending a text and/or a chatbot to a first device of the initiating user.

4. The method of claim 1, further comprising:
determining a preference mode for other users of the plurality of users, the preference mode being determined using the knowledge corpus, and the knowledge corpus includes preferences for each of the plurality of users;

determining when the other users are present in the vicinity;

determining when a likelihood of another user of the plurality of users being interested in receiving an answer to the question or command meets or exceeds a threshold for receiving an answer, such determination being made using predictive modeling and based on the knowledge corpus; and initiating a communication, including the answer, using one or more communication modes for each of the plurality of users, based on the preference mode for each of the other users determined to be interested in receiving the answer.

5. The method of claim 4, wherein the communication modes include a simulated voice from the AI device and/or a chatbot sent to the one or more other users by the AI system.

6. The method of claim 4, wherein the AI system sends a text and/or a chatbot to each of one or more devices of the one or more other users, respectively, in response to the determining of the preference mode for each of the other users of the plurality of users, and when one or more of the other users are determined to be interested in receiving the answer to the question or command.

7. The method of claim 1, further comprising:
developing a knowledge corpus for the plurality of users of an AI system, the knowledge corpus including preferences for each of the users, such preferences including whether a user of the plurality of users prefers voice responses, or prefers chatbot responses.

8. The method of claim 1, wherein the predictive modeling includes:
analyzing the knowledge corpus for historical data of each of the users for users' questions and answers and profile data to determine a user's interest level in a topic and preferences for receiving an answer.

9. The method of claim 1, wherein the AI device includes a microphone for listening to voice activation and instructions, and a speaker for transmitting a voice simulation.

10. The method of claim 1, further comprising:
analyzing feedback parameters pertaining to one or more of the plurality of users, the feedback parameters including biometric feedback for the one or more users and/or audio or visual feedback for the one or more users;

determining a possible cognitive state of each of the one or more users, based on the analyzing of the feedback parameters and using predictive analysis based on the knowledge corpus; and initiating a communication, to each of the one or more users, via a communication mode to the question or command based on the possible cognitive state of the one or more users.

11. A system for customizing responses by an Artificial Intelligence (AI) system using a response mode for interaction with a user, which comprises:
a computer system comprising: a computer processor, a computer-readable storage medium, and program instructions stored on the computer-readable storage medium being executable by the processor, to cause the computer system to:

receive a question or command at an AI system from an associated AI device which receives the question or command from an initiating user of a plurality of users in a vicinity of the AI device;

determine a preference of an interaction mode for the initiating user, the preferred interaction mode being determined using a knowledge corpus;

generate an answer to the question or command using the AI system;

initiate, using the AI device, a communication to the initiating user which includes the answer, via a communication mode based on the interaction mode preference of the initiating user;

determine a preference mode for another user of the plurality of users, the preference mode being determined using the knowledge corpus, and the knowledge corpus includes preferences for the another user;

determine when a likelihood of the another user being interested in receiving an answer to the question or command meets or exceeds a threshold for receiving an answer, the determination using predictive modeling and being based on the knowledge corpus; and initiate a communication including the answer, using a communication mode for the another user based on the preference mode for the another user, in response to the determining of the another user being interested in receiving the answer.

12. The system of claim 11, wherein the communication mode includes a simulated voice from the AI device, or using a chatbot sent to a first device of the initiating user by the AI system.

13. The system of claim 11, wherein the communication mode includes the AI system sending a text and/or a chatbot to a first device of the initiating user.

14. The system of claim 11, further causing the computer system to:
- determine a preference mode for other users of the plurality of users, the preference mode being determined using the knowledge corpus, and the knowledge corpus includes preferences for each of the plurality of users;
- determine when the other users are present in the vicinity;
- determine when a likelihood of another user of the plurality of users being interested in receiving an answer to the question or command meets or exceeds a threshold for receiving an answer, such determination being made using predictive modeling and based on the knowledge corpus; and
- initiate a communication, including the answer, using one or more communication modes for each of the plurality of users, based on the preference mode for each of the other users determined to be interested in receiving the answer.

15. The system of claim 14, wherein the communication modes include a simulated voice from the AI device and/or a chatbot sent to the one or more other users by the AI system.

16. The system of claim 14, wherein the AI system sends a text and/or a chatbot to each of one or more devices of the one or more other users, respectively, in response to the determining of the preference mode for each of the other users of the plurality of users, and when one or more of the other users are determined to be interested in receiving the answer to the question or command.

17. The system of claim 11, further causing the computer to:
- develop a knowledge corpus for the plurality of users of an AI system, the knowledge corpus including preferences for each of the users, such preferences including whether a user of the plurality of users prefers voice responses, or prefers chatbot responses.

18. The system of claim 11, wherein the predictive modeling includes:
- analyzing the knowledge corpus for historical data of each of the users for users' questions and answers and profile data to determine a user's interest level in a topic and preferences for receiving an answer.

19. The system of claim 11, wherein the AI device includes a microphone for listening to voice activation and instructions, and a speaker for transmitting a voice simulation.

20. A computer program product for customizing responses by an Artificial Intelligence (AI) system using a response mode for interaction with a user, the computer program product comprising a computer readable storage medium having program instructions embodied therewith, wherein the computer readable storage medium is not a transitory signal per se, the program instructions executable by a computer to cause the computer to perform a method, comprising:
- receiving a question or command at an AI system from an associated AI device which receives the question or command from an initiating user of a plurality of users in a vicinity of the AI device;
- determining a preference of an interaction mode for the initiating user, the preferred interaction mode being determined using a knowledge corpus;
- generating an answer to the question or command using the AI system; initiating, using the AI device, a communication to the initiating user which includes the answer, via a communication mode based on the interaction mode preference of the initiating user;
- determine a preference mode for another user of the plurality of users, the preference mode being determined using the knowledge corpus, and the knowledge corpus includes preferences for the another user;
- determine when a likelihood of the another user being interested in receiving an answer to the question or command meets or exceeds a threshold for receiving an answer, the determination using predictive modeling and being based on the knowledge corpus; and
- initiate a communication including the answer, using a communication mode for the another user based on the preference mode for the another user, in response to the determining of the another user being interested in receiving the answer.

* * * * *